(12) United States Patent
Tian et al.

(10) Patent No.: US 12,184,197 B2
(45) Date of Patent: Dec. 31, 2024

(54) ADAPTER AND CONTROL METHOD

(71) Applicant: GUANGDONG OPPO MOBILE TELECOMMUNICATIONS CORP., LTD, Dongguan (CN)

(72) Inventors: Chen Tian, Dongguan (CN); Jialiang Zhang, Dongguan (CN)

(73) Assignee: GUANGDONG OPPO MOBILE TELECOMMUNICATIONS CORP., LTD, Dongguan (CN)

( * ) Notice: Subject to any disclaimer, the term of this patent is extended or adjusted under 35 U.S.C. 154(b) by 285 days.

(21) Appl. No.: 17/858,453

(22) Filed: Jul. 6, 2022

(65) Prior Publication Data

US 2022/0337169 A1 Oct. 20, 2022

Related U.S. Application Data

(63) Continuation of application No. PCT/CN2020/070776, filed on Jan. 7, 2020.

(51) Int. Cl.
*H02M 7/217* (2006.01)
*H02J 7/04* (2006.01)
(Continued)

(52) U.S. Cl.
CPC .............. *H02M 7/217* (2013.01); *H02J 7/04* (2013.01); *H02M 1/088* (2013.01); *H04B 1/04* (2013.01); *H04B 1/16* (2013.01); *H02J 2207/20* (2020.01)

(58) Field of Classification Search
CPC .......... H02M 7/217; H02M 1/088; H02J 7/04; H02J 2207/20; H04B 1/04; H04B 1/16
(Continued)

(56) References Cited

U.S. PATENT DOCUMENTS 9,985,547 B2 * 5/2018 Kikuchi ............ H02M 3/33592
2017/0170734 A1 * 6/2017 Sheng ................ H02M 1/4258
(Continued)

FOREIGN PATENT DOCUMENTS

CN 101261764 A 9/2008
CN 101617474 A 12/2009
(Continued)

OTHER PUBLICATIONS

The supplementary European search report dated Dec. 13, 2022 from European patent Application No. 20912661.4.
(Continued)

*Primary Examiner* — Yemane Mehari
(74) *Attorney, Agent, or Firm* — Quarles & Brady LLP

(57) ABSTRACT

An adapter and a control method are provided. The adapter includes a transformer, at least one first transistor, a control unit, and a first microwave unit. The at least one first transistor is connected to a primary side of the transformer, and is configured to perform a chopping modulation on a voltage input to the transformer. The control unit is configured to output a first control signal. The first microwave unit includes a first transmitting terminal and a first receiving terminal. The first transmitting terminal is configured to convert the first control signal into a first microwave signal and transmit it to the first receiving terminal of the first microwave unit. The first receiving terminal is configured to convert the first microwave signal into the first control signal to control the at least one first transistor to be turned on or off.

20 Claims, 9 Drawing Sheets

(51) Int. Cl.
  *H02M 1/088* (2006.01)
  *H04B 1/04* (2006.01)
  *H04B 1/16* (2006.01)

(58) Field of Classification Search
  USPC .......................................................... 363/127
  See application file for complete search history.

(56) References Cited

U.S. PATENT DOCUMENTS

| | | | |
|---|---|---|---|
| 2018/0286612 A1 | 10/2018 | Mantese et al. | |
| 2019/0157895 A1* | 5/2019 | Zhang | ...................... H02J 7/00 |

FOREIGN PATENT DOCUMENTS

| | | | | |
|---|---|---|---|---|
| CN | 103178595 | A | 6/2013 | |
| CN | 106026705 | A | 10/2016 | |
| CN | 205882810 | U | 1/2017 | |
| CN | 109412435 | A | 3/2019 | |
| EP | 3386108 | A1 | 10/2018 | |
| EP | 3444932 | A1 | 2/2019 | |
| GB | 2446622 | A * | 8/2008 | .............. H02J 5/005 |
| WO | 2019039488 | A1 | 2/2019 | |

OTHER PUBLICATIONS

Shuichi Nagai et al, "A DC-isolated gate drive IC with drive-by-microwave technology for power switching devices", Solid-State Circuits Conference Digest of Technical Papers (ISSCC), 2012 IEEE International, IEEE, Feb. 19, 2012 (Feb. 19, 2012), the whole document.

Nagai Shuichi et al, "A Drive-by-Microwave isolated gate driver with a high-speed voltage monitoring", 2013 25th International Symposium on Power Semiconductor Devices & IC's (ISPSD), IEEE, Jun. 15, 2014 (Jun. 15, 2014), the whole document.

Texas Instruments, "ISO5451 High-CMTI 2.5-A / 5-A Isolated IGBT, MOSFET Gate Driver with Active Safety Features", Jun. 30, 2015 (Jun. 30, 2015), the whole document.

International Search Report and Written Opinion Dated Sep. 30, 2020 from PCT Application No. PCT/CN2020/070776.

The First Office Action dated May 6, 2024 from Chinese patent application No. 202080083923.1.

* cited by examiner

ADAPTER AND CONTROL METHOD

CROSS REFERENCE TO RELATED APPLICATIONS

This application is a continuation of International Application No. PCT/CN2020/070776, filed on Jan. 7, 2020, the entirety of which is hereby incorporated by reference.

FIELD OF DISCLOSURE

The present disclosure relates to the field of charging technologies, and more particularly, to an adapter and a control method.

BACKGROUND

A charger is generally composed of a transformer, a control unit, a driving unit, a MOS transistor, etc. When a driving control of the MOS transistor is performed through the control unit, a setting of a dead time of a control signal is limited, which reduces the efficiency. In addition, a parasitic interference generated by the MOS transistor connected to a secondary side may be transmitted to other circuit modules, thereby causing crosstalk in the circuit.

SUMMARY OF DISCLOSURE

Embodiments of the present disclosure provide an adapter and a control method.

In a first aspect, an adapter is provided and includes a transformer, at least one first transistor, a control unit, and a first microwave unit. The at least one first transistor is connected to a primary side of the transformer, and is configured to perform a chopping modulation on a voltage input to the transformer. The control unit is configured to output a first control signal. The first microwave unit includes a first transmitting terminal and a first receiving terminal. The first transmitting terminal is connected to the control unit, the first receiving terminal is configured to convert the first control signal into a first microwave signal and transmit it to the first receiving terminal, and the first receiving terminal is configured to convert the first microwave signal into the first control signal to control the at least one first transistor to be turned on or off.

In a second aspect, a control method is provided. The method is applied to an adapter, the adapter includes a transformer, at least one first transistor, a control unit, and a first microwave unit. The method includes: outputting a first control signal by the control unit; controlling, by the control unit, a first transmitting terminal of the first microwave unit to convert the first control signal into a first microwave signal and transmit it to a first receiving terminal of the first microwave unit; and controlling, by the control unit, the first receiving terminal to convert the first microwave signal into the first control signal to control the at least one first transistor to be turned on or off.

In a third aspect, a computer-readable storage medium storing a computer program is provided. The computer program causes a computer to perform the method described in the second aspect or in any one of its implementations.

In a fourth aspect, a computer program product is provided. The computer program product includes computer program instructions, and the computer program instructions cause a computer to execute the method described in the second aspect or in any one of its implementations.

The details of one or more implementations are set forth in the accompanying drawings and the description below. Other features and advantages will be apparent from the description and drawings, and from the claims.

DETAILED DESCRIPTION

Technical solutions in the embodiments of the present disclosure will be clearly and completely described below with reference to the accompanying drawings. Obviously, the described embodiments are a part of the embodiments of the present disclosure, but not all of the embodiments. Based on the embodiments in the present disclosure, all other embodiments obtained by those of ordinary skill in the art without creative efforts shall fall within a protection scope of the present disclosure.

In order to understand the present disclosure more clearly, a working principle and process of an adapter will be introduced below with reference to FIG. 1, so as to facilitate the subsequent understanding of the present disclosure. However, it should be understood that the content introduced below is only for a better understanding of the present disclosure, and should not create a special limitation on the present disclosure.

Small portable electronic equipment and power supply conversion equipment for electronic appliances (for example, adapters, chargers, car chargers, etc.) are generally composed of a shell, a transformer, an inductor, a capacitor, a control IC, a PCB board, and other components, which are used to convert AC input into DC output.

Figure 1:
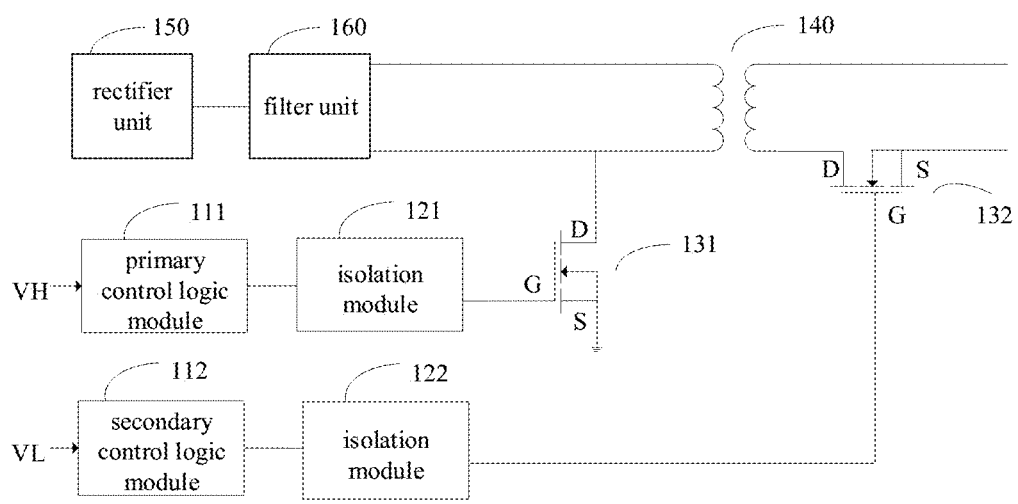
FIG. 1 illustrates a schematic structural diagram of an adapter of an embodiment of the present disclosure.

As illustrated in FIG. 1, in one embodiment, an adapter may include a primary control logic module 111, a secondary control logic module 112, an isolation module 121, an isolation module 122, a primary side MOS transistor 131, at least one secondary side metal oxide semiconductor field effect transistor (MOSFET) 132 (abbreviated as MOS transistor), a transformer140, a rectifier unit 150, and a filter unit 160.

In the embodiment of the present disclosure, the isolation module 121 or the isolation module 122 may be a signal transformer, a capacitor, or an optocoupler, and the like. The transformer 140 may be an energy transformer.

In the embodiment of the present disclosure, the rectifier unit 150 can rectify an alternating current input to the adapter, and the filter unit 160 can filter a rectified direct current.

Generally, when the primary control logic module 111 and the secondary control logic module 112 output high voltage, the primary side MOS transistor 131 is turned on, the secondary side MOS transistor 132 is turned off, and a primary side of the transformer 140 stores energy. When the primary control logic module 111 and the secondary control logic module 112 output low voltage, the secondary side MOS transistor 132 is turned on, the primary side MOS transistor 131 is turned off, and the primary side of the transformer 140 releases energy to a secondary side to charge an electronic device connected to the adapter.

Examples of the electronic device in embodiments of the present disclosure include, but not limited to, a satellite or cellular telephone, a Personal Communication System (PCS) terminal capable of combining with a cellular wireless telephone and data processing, faxing and data communication abilities, a Personal Digital Assistant (PDA) that may include a radio telephone, a pager, an internet/intranet access, a Web browser, a memo pad, a calendar and/or a Global Position System (GPS) receiver, and a conventional laptop and/or palmtop receiver or other electronic devices including a radio telephone receiver. In some embodiments, a device to be charged may refer to the mobile terminal being a device or a handheld terminal device, such as a mobile phone, a pad, and the like. In some embodiments, the device to be charged mentioned in the embodiments of the present disclosure may refer to a chip system, and in this embodiment, a battery of the device to be charged may or may not belong to the chip system.

In addition, the electronic devices may also include other devices to be charged that require charging, such as mobile phones, mobile power sources (such as power banks, travel chargers, etc.), electric vehicles, laptops, drones, tablet computers, e-books, e-cigarettes, smart devices to be charged, and small electronic products. The smart devices to be charged may include, for example, watches, wristbands, smart glasses, and cleaning robots. The small electronic products may include, for example, wireless earphones, Bluetooth speakers, electric toothbrushes, and rechargeable wireless mice.

In the embodiment of the present disclosure, when the control logic modules (the primary control logic module 111 and the secondary control logic module 112) are used to control the MOS transistor to be turned on or off, the MOS transistor will generate a parasitic capacitance. If a frequency of the control signal output by the control logic modules is low, for example, when the frequency is 100 KHz and a period is 10 us, a dead time can be set to 1.2 us. If the primary control logic module 111 controls the primary side MOS transistor 131 to switch from a turn-on state to a turn-off state, within the dead time, the primary MOS transistor 131 can be completely turned off, the dead time is cut off, and the secondary side MOS transistor 132 is turned on by the secondary control logic module 112. Therefore, a parasitic capacitance generated by the primary side MOS transistor 131 will not be transmitted to other circuit modules, for example, the secondary side MOS transistor 132, and thus will not cause circuit crosstalk.

When the frequency of the control signal output by the control logic modules (the primary control logic module 111 and the secondary control logic module112) is high, for example, when the frequency is 250 KHz and the period is 4 us, if the dead time is set to 1.2 us, the primary side MOS transistor131 or the secondary side MOS transistor132 is turned on for 0.8 us in one cycle, resulting in lower efficiency. If the dead time is set to 0.4 us, when the primary control logic module 111 controls the primary side MOS transistor 131 to switch from the turn-on state to the turn-off state, within this dead time, the primary side MOS transistor 131 has not been completely turned off and the secondary side MOS transistor 132 has been turned on, resulting in a parasitic capacitance generated by the secondary side MOS transistor 132 being transmitted to other circuit modules (e.g., the primary side MOS transistor 131) through the transformer or the capacitor or the optocoupler 122, thereby causing circuit crosstalk.

In some embodiments, an isolation between the primary side MOS transistor 131 and the secondary side MOS transistor 132 can be performed using a signal transformer, a capacitor, or an optocoupler (also referred to as an optocoupler or an opto-isolator). However, with these isolation methods, location settings are limited. For example, for the signal transformer, since the transformer implements voltage transformation according to a principle of electromagnetic induction, a distance between the primary side and the secondary side of the signal transformer cannot be set too large. However, when the distance between the primary side and the secondary side of the signal transformer is small, if the primary control logic module 111 outputs high voltage, the parasitic capacitance generated by the primary side MOS transistor 131 at high frequencies is transmitted to other circuit modules (e.g., to the secondary side MOS transistor 132) through the signal transformer 122, thereby causing circuit crosstalk.

Similarly, for a capacitor, a capacitance of the capacitor is inversely proportional to a distance between two plates. That is, the greater the distance between the two plates, the smaller the capacity of the capacitor, and the smaller the distance between the two plates, the greater the capacity of the capacitor. Therefore, the distance between the two pole plates of the capacitor cannot be set too large. However, when the distance between the two plates is small, if the primary side control logic module 111 outputs high voltage, the parasitic capacitance generated by the primary side MOS transistor 131 at high frequency will be transmitted to other circuit modules (e.g., to the secondary side MOS transistor 132) through the capacitor 122, thereby causing crosstalk in the circuit.

Similarly, for an optocoupler, since the optocoupler transmits electrical signals using light as a medium, the transmission of light waves is related to distance. That is, the greater the distance of light wave transmission, the greater the energy loss, the smaller the distance of light wave transmission, the smaller the energy loss. Therefore, the distance between a light emitter and a light receiver of the optocoupler cannot be set too large. However, when the distance between the light emitter and the light receiver of the optocoupler is small, if the primary side control logic module 111 outputs high voltage, the parasitic capacitance generated by the primary side MOS transistor 131 at high frequency will be transmitted to other circuit modules (e.g., to the secondary side MOS transistor 132) through the optocoupler 122, thereby causing circuit crosstalk.

The adapter of the embodiment of the present disclosure adopts a microwave unit to transmit the control signal. When the output frequency is high, the dead time of the control signal can be set to be shorter, so that the efficiency can be improved without affecting the crosstalk of the circuit. In addition, by using the first microwave unit to control the turn-on and turn-off of the first transistor, the distance between the first transmitting terminal and the first receiving terminal can be set farther. The transmission of the parasitic capacitance caused by the first transistor can be prevented, and the crosstalk of the circuit can also be prevented.

The adapter of the embodiment of the present disclosure will be introduced in detail below with reference to FIG. 2.

Figure 2:
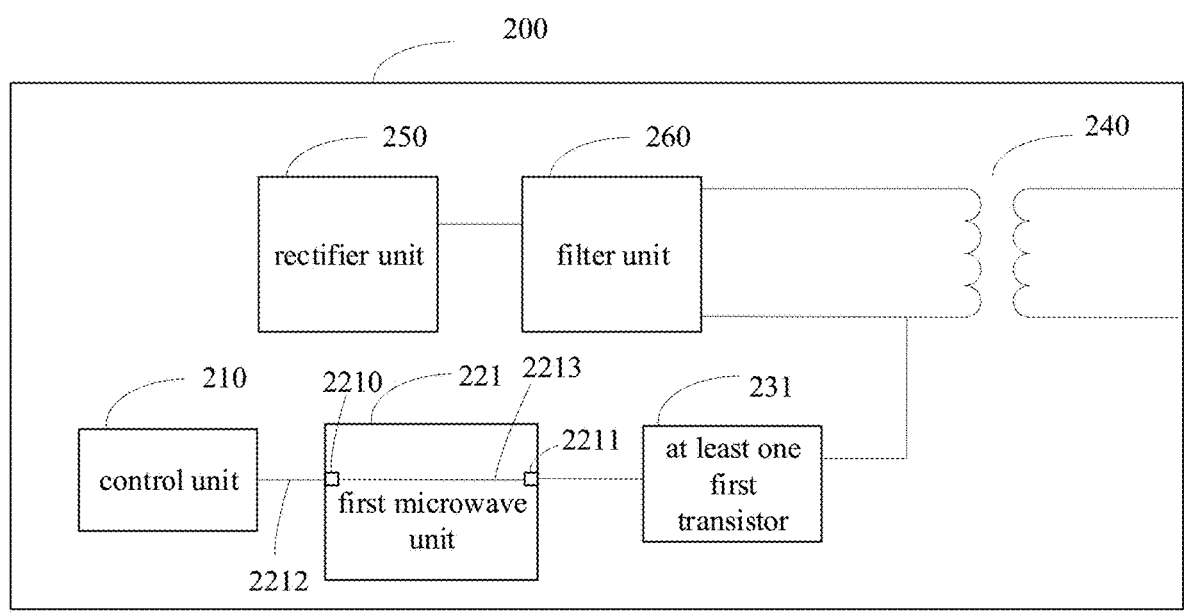
FIG. 2 illustrates a schematic structural diagram of an adapter of an embodiment of the present disclosure.

As illustrated in FIG. 2, the adapter 200 of an embodiment of the present disclosure may include a control unit 210, a first microwave unit 221, at least one first transistor 231, a transformer 240, a rectifier unit 250, and a filter unit 260.

In the embodiment of the present disclosure, the rectifier unit 250 may rectify an alternating current input to the adapter, and the filter unit 260 may filter a rectified alternating current.

The at least one first transistor 231 is connected to a primary side of the transformer 240, is configured to perform a chopping modulation on a voltage input to the transformer 240.

In the embodiment of the present disclosure, the at least one first transistor 231 can be configured to perform the chopping modulation on the voltage input to the transformer 240. For example, the voltage of the direct current output by a secondary side of the transformer 240 can be changed by adjusting a duty cycle of the first transistor 231.

The control unit 210 is configured to output a first control signal 2212.

In the embodiment of the present disclosure, the control unit 210 can be configured to output the first control signal 2212. The first control signal 2212 may be a pulse signal with a period of 4 us or a pulse signal with a period of 0.02 ns, which is not specifically limited in the present disclosure.

The first microwave unit 221 includes a first transmitting terminal 2210 and a first receiving terminal 2211. The first transmitting terminal 2210 is connected to the control unit 210. The first receiving terminal is 2211 connected to the at least one first transistor 231. The first transmitting terminal 2211 is configured to convert the first control signal 2212 into a first microwave signal 2213 and transmit it to the first receiving terminal 2211. The first receiving terminal 2211 is configured to convert the first microwave signal 2213 into the first control signal 2212, so as to control the at least one first transistor 231 to be turned on or off.

In the embodiment of the present disclosure, after receiving the first control signal 2212 by the control unit 210, the first transmitting terminal 2210 of the first microwave unit 221 can convert the first control signal 2212 into the first microwave signal 2213, and transmit the first microwave signal 2213 to the first receiving terminal 2211. After receiving the first microwave signal 2213, the first receiving terminal 2211 can convert the first microwave signal 2213 into the first control signal 2212, so that the converted first control signal 2212 can be configured to control the at least one first transistor 231 to be turned on or off.

In the adapter of the embodiment of the present disclosure, in the process of transmitting the control signal, the first transmitting terminal of the first microwave unit can convert the first control signal into the first microwave signal and transmit the first microwave signal to the first receiving terminal of the first microwave unit. After receiving the first microwave signal, the first receiving terminal can convert the first microwave signal into the first control signal, so that the converted first control signal can be configured to control the at least one first transistor 231 to be turned on or off. On the one hand, the first microwave unit has a fast response speed, and its first transmitting terminal can convert the first control signal into the first microwave signal and quickly transmit it to the first receiving terminal. Therefore, even if the dead time of the first control signal is short, the first transistor can be turned on or off quickly without causing crosstalk in the circuit. On the other hand, the transmission of microwaves does not depend on a medium to transmit.

Therefore, the distance between the first transmitting terminal and the first receiving terminal of the first microwave unit can be set farther, which can isolate the transmission of a parasitic capacitance generated by the first transistor, thereby preventing the crosstalk of the circuit.

Figure 3:
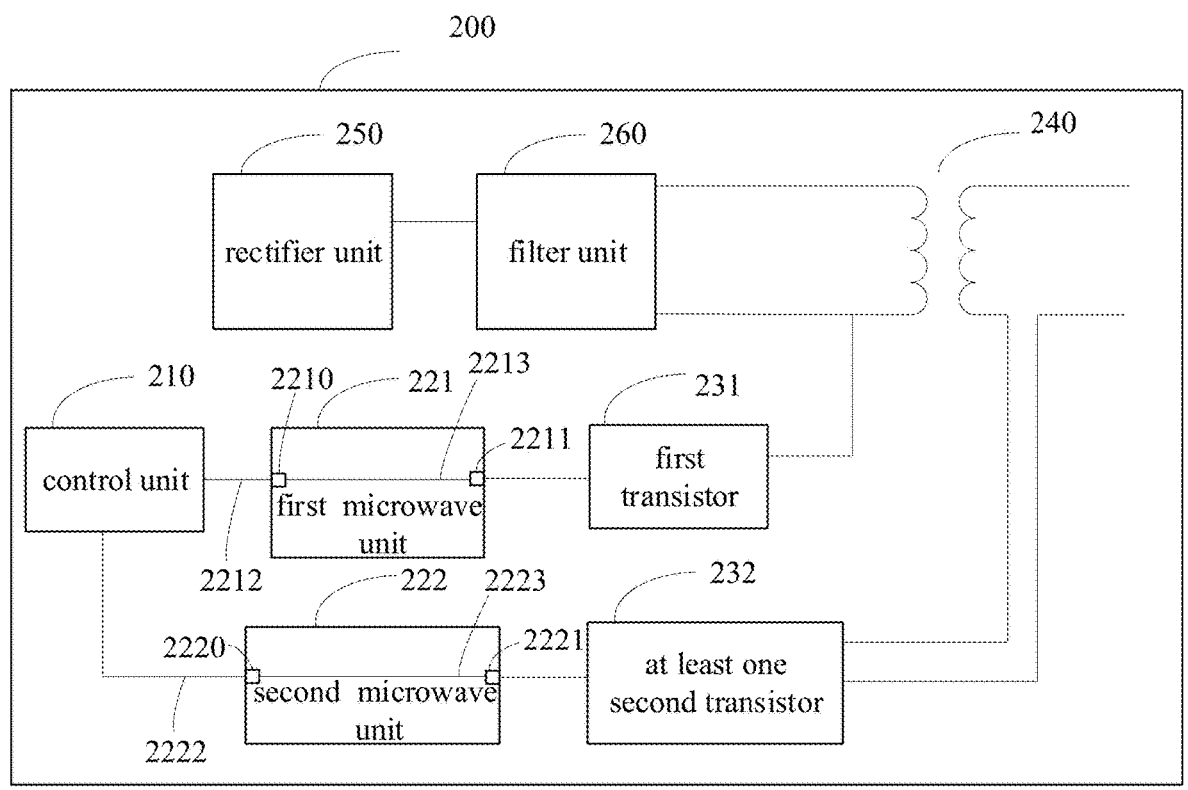
FIG. 3 illustrates a schematic structural diagram of an adapter of an embodiment of the present disclosure.

Alternatively, in some embodiments, as illustrated in FIG. 3, the adapter 200 may further include a second microwave unit 222 and at least one second transistor 232.

The at least one second transistor 232 is configured to synchronously rectify a direct current output by the transformer 240.

In the embodiment of the present disclosure, the at least one second transistor 232 can be configured to synchronously rectify the direct current output by the transformer 240, so that the electronic device connected to the adapter can be charged based on the synchronous rectified direct current.

The control unit 210 is also configured to output the second control signal 2222.

The second microwave unit 222 includes a second transmitting terminal 2220 and a second receiving terminal 2221. The second transmitting terminal 2220 is connected to the control unit 210. The second receiving terminal 2221 is connected to the at least one second transistor 232. The second transmitting terminal 2220 is configured to convert the second control signal 2222 into a second microwave signal 2223 and transmit it to the second receiving terminal 2221. The second receiving terminal 2221 is configured to convert the second microwave signal 2223 into the second control signal 2222, so as to control the at least one second transistor 232 to be turned on or off.

Similarly, in the embodiment of the present disclosure, after receiving the second control signal 2222 by the control unit 210, the second transmitting terminal 2221 of the second microwave unit 222 can convert the second control signal 2222 into the second microwave signal 2223, and transmit the second microwave signal 2223 to the second receiving terminal 2221. After receiving the second microwave signal 2223, the second receiving terminal 2221 can convert the second microwave signal 2223 into the second control signal 2222, so that the turned-on or turn-off of the at least one second transistor 232 can be controlled by using the converted second control signal 2222.

Alternatively, in some embodiments, the first microwave unit and/or the second microwave unit includes an integrated circuit (IC) chip. An extremely high frequency antenna is packaged in the IC chip.

In the embodiment of the present disclosure, the extremely high frequency (EHF) antenna can be packaged in the IC chip, including a transmitting antenna and a receiving antenna, that is, the transmitting terminal and the receiving terminal in the embodiment of the present disclosure. Thus, the microwave unit can realize high-speed wireless data transmission (e.g., up to 6 GB/s transfer speed) based on a high carrier frequency (e.g., 60 GHz).

In the embodiment of the present disclosure, it can be understood that, taking the first microwave unit 221 as an example, the first transmitting terminal 2210 of the first microwave unit 221 can convert the first control signal 2212 by the control unit 210 into the first microwave signal 2213. In the process of transmission, the microwave signal can be transmitted without relying on the medium to transmit, and the transmission speed in vacuum is equal to the speed of light. Therefore, after using the first transmitting terminal 2210 of the first microwave unit 221 to convert the first control signal 2212 into the first microwave signal 2213, the first microwave signal 2213 can be quickly transmitted to the first receiving terminal 2211 of the first microwave unit 221. The first receiving terminal 2211 of the first microwave unit 221 then converts the first microwave signal 2213 into the first control signal 2212, so that at least one first transistor 231 can respond quickly.

In the embodiments of the present disclosure, the first transistor 231 and/or the second transistor 232 may be insulated gate bipolar transistors (IGBT), MOS transistors, or triodes, etc., which are not specifically limited in the present disclosure.

In the embodiments of the present disclosure described above, the transmitting terminal of the microwave unit can convert the control signal into the microwave signal, and transmit the microwave signal to the receiving terminal. The receiving terminal can convert the microwave signal into the control signal to control the turn-on or turn-off of the transistor, so that the transformer connected to the transistor can continuously store and release energy. In addition, in the embodiments of the present disclosure, the microwave unit can also be configured to isolate the parasitic capacitance generated by the transistor, which will be described in detail below.

Alternatively, in some embodiments, the first microwave unit 221 is further configured to transmit the first control signal 2212 to control the turn-on or turn-off of the at least one first transistor 231, and isolate the parasitic capacitance generated by the at least one first transistor 231.

Alternatively, in some embodiments, the second microwave unit 222 is further configured to transmit the second control signal 2222 to control the turn-on or turn-off of the at least one second transistor 232, and isolate the parasitic capacitance generated by the at least one second transistor 232.

In the embodiment of the present disclosure, taking one first transistor 231 and one second transistor 232 as an example, the control unit 210 can output a high voltage signal. The first microwave unit 221 transmits a signal to the first transistor231 to control the turn-on of the first transistor 231, so that energy can be stored to the primary side of the transformer 240. The control unit 210 can also output a low voltage signal. The second microwave unit 222 transmits a signal to the second transistor 232 to control the turn-on of the second transistor 232, so that the energy stored on the primary side of the transformer 240 can be released to the secondary side.

In the embodiment of the present disclosure, the primary side of the transformer 240 may refer to a side connected to the first transistor 231, and the secondary side of the transformer 240 may refer to a side connected to the second transistor 232.

In the embodiment of the present disclosure, the first microwave unit 221 can also isolate the parasitic capacitance generated by the first transistor 231 in the process of controlling the turn-on or turn-off of the first transistor 231. That is, the parasitic capacitance generated by the first transistor 231 can be isolated and transmitted to other circuit modules (e.g., transmitted to the second transistor 232), thereby preventing the crosstalk of the circuit. The second microwave unit 222 can also isolate the parasitic capacitance generated by the second transistor 232 in the process of controlling the turn-on or turn-off of the second transistor 232. That is, the parasitic capacitance generated by the second transistor 232 can be isolated and transmitted to other circuit modules (e.g., transmitted to the first transistor 231), thereby preventing the crosstalk of the circuit.

The following description will be given by taking the transistor as a MOS transistor as an example, as illustrated in FIG. 4, which is a schematic structural diagram of an adapter of an embodiment of the present disclosure.

In the embodiment of the present disclosure, the first transistor in the adapter may be a transistor included in a half-bridge circuit or a transistor included in a full-bridge circuit, which is not specifically limited in the present disclosure. They will be explained separately below.

Figure 4A:
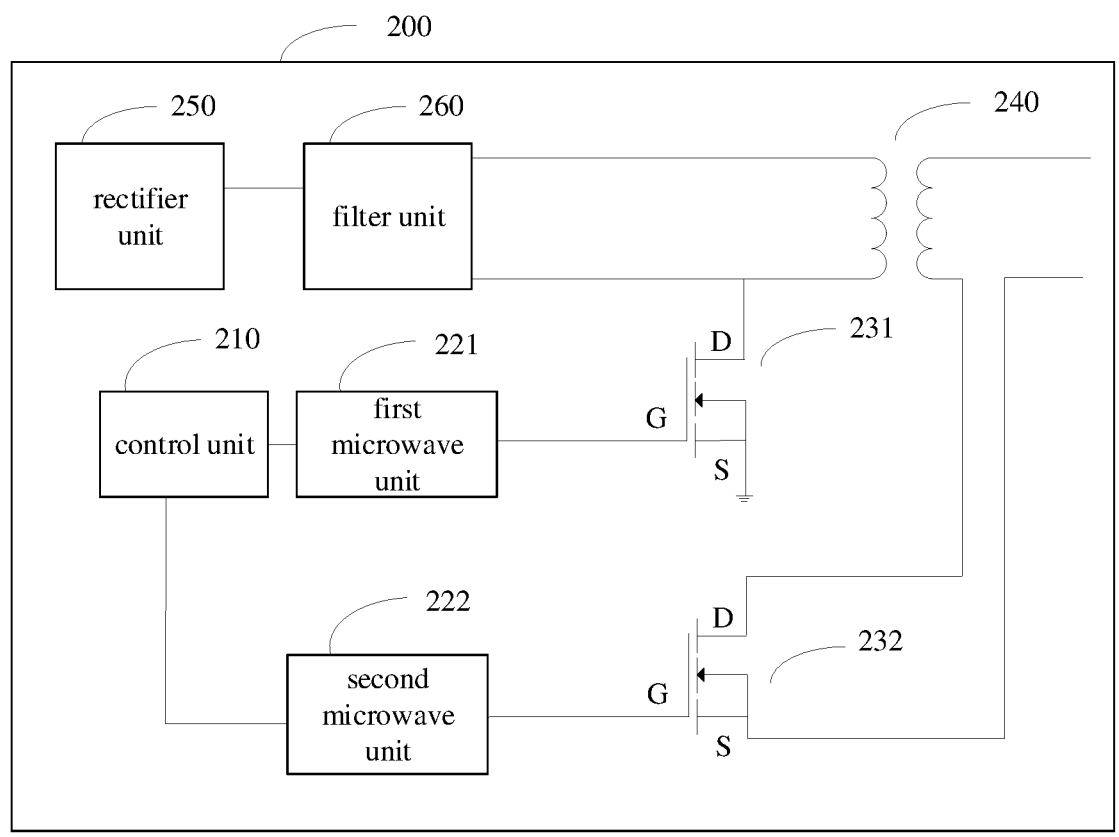
FIG. 4a illustrates a schematic structural diagram of an adapter of an embodiment of the present disclosure.

As illustrated in FIG. 4a, in the embodiment of the present disclosure, the first transistor 231 may be an N-channel MOS transistor, and the second transistor 232 may be an N-channel MOS transistor. When the control unit 210 outputs a high voltage signal, if a pin connected to the MOS transistor 231 is turned on, the first transmitting terminal of the first microwave unit 221 can convert the high voltage signal into the first microwave signal, and the first microwave signal is transmitted to the first receiving terminal of first microwave unit 221. After receiving the first microwave signal, the first receiving terminal can convert the first microwave signal into the first control signal, and transmit the first control signal to the N-channel MOS transistor 231. At this time, since a gate voltage of the N-channel MOS transistor 231 is higher than a source voltage, the N-channel MOS transistor 231 can be turned on.

When the control unit 210 outputs a high voltage signal, if a pin connected to the MOS transistor 232 is turned on, the high voltage signal can be converted into the second microwave signal through the transmitting terminal of the second microwave unit222, and the second microwave signal can be transmitted to the second receiving terminal of the second microwave unit 222. After the second receiving terminal receives the second microwave signal, it can convert the second microwave signal into the second control signal, and transmit the control signal to the MOS transistor 232. At this time, since a gate voltage of the N-channel MOS transistor 232 is higher than a source voltage, the MOS transistor 232 can be turned on.

In the embodiments of the present disclosure, on the one hand, due to a fast transmission speed of microwaves, even at a high frequency, for example, when the frequency is 250 KHz, that is, a period is 4 us, a dead time of the control signal can be set to be shorter. If the dead time is set to 0.4 us, the first transmitting terminal of the first microwave unit 221 can convert the signal output by the control unit 210 into the first microwave signal and quickly output it to the first receiving terminal of the first microwave unit 221 within 0.4 us. After the first receiving terminal receives the first microwave signal, the first microwave signal can be converted into the first control signal and output to the MOS transistor 231. Using the second transmitting terminal of the second microwave unit 222, the signal output by the control unit 210 can be converted into the second microwave signal and quickly output to the second receiving terminal. After receiving the second microwave signal, the second receiving terminal can convert the second microwave signal into the second control signal and output it to the MOS transistor 232. Moreover, an opening time of the control unit 210 in a half cycle is 1.6 us, which is greater than the dead time of 0.4 us, which can improve the transmission efficiency.

On the other hand, the microwave unit is different from transformers, capacitors, and optocouplers. The microwaves do not need a medium to transmit, and almost pass through without being absorbed. Therefore, the distance between the transmitting terminal and the receiving terminal of the microwave unit can be set farther, for example, it can be set to 1.5 cm or 2 cm.

For the transformers, the capacitors, and the optocouplers, the transformers work through a principle of electromagnetic induction, and the capacitors work through charge movement. Light waves are electromagnetic waves in a specific frequency band, and the transmission of light waves is related to distance. In the above transmission modes, the distance between the transmitting terminal and the receiving terminal is less than a certain threshold, so that the signal can be transmitted to the transmitter.

However, in the embodiment of the present disclosure, the distance between the transmitting terminal and the receiving terminal of the first microwave unit 221 and the second microwave unit 222 can be set to be farther. For example, it can be set to 1.5 cm or 2 cm, etc. mentioned above. Furthermore, the parasitic capacitance generated by the MOS transistor 231 or the MOS transistor 232 can be isolated to prevent crosstalk of circuits.

In other words, when the MOS transistor 231 is turned on, the parasitic capacitance generated by the MOS transistor 231 cannot be transmitted to other circuit modules, such as the MOS transistor 232, due to the large distance between the first transmitting terminal and the first receiving terminal of the first microwave unit. When the MOS transistor 232 is turned on, the parasitic capacitance generated by the MOS transistor 232 cannot be transmitted to other circuit modules, such as the MOS transistor 231, due to the large distance between the second transmitting terminal and the second receiving terminal of the second microwave unit.

In the embodiment of the present disclosure, the parasitic capacitance may also be referred to as a stray capacitance, which is the capacitance characteristic exhibited by the transistor at high frequencies.

Figure 4B:
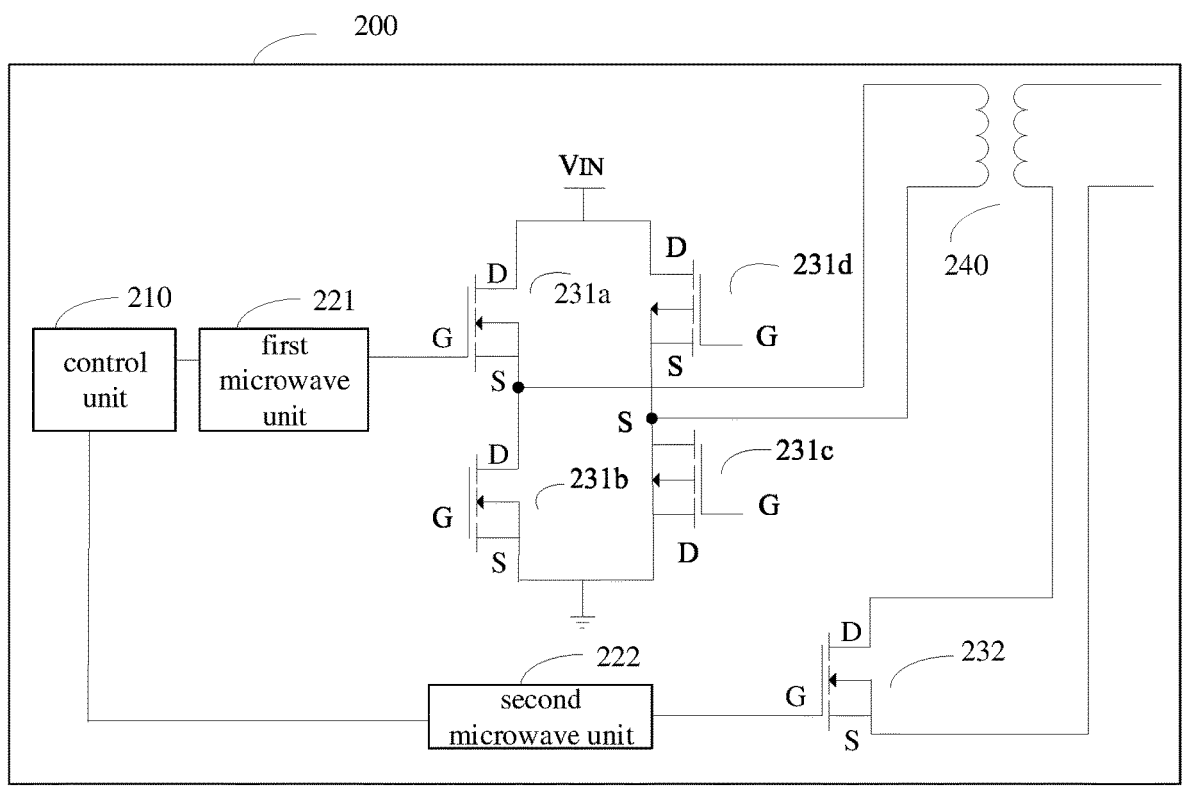
FIG. 4b illustrates a schematic structural diagram of an adapter of an embodiment of the present disclosure.

As illustrated in FIG. 4b, which illustrates a schematic structural diagram of an adapter of an embodiment of the present disclosure. The first transistor in the adapter in the embodiment of the present disclosure may be a transistor included in a full-bridge circuit. As illustrated in FIG. 4b, in the embodiment of the present disclosure, the full-bridge circuit may include an N-channel MOS transistor 231a, an N-channel MOS transistor 231b, an N-channel MOS transistor 231c, and an N-channel MOS transistor 231d.

It should be understood that, in the embodiment of the present disclosure, the full-bridge circuit diagram is not limited to that illustrated in FIG. 4b, and may also be other forms of circuit diagrams, which should not be limited to the present disclosure.

Alternatively, in some embodiments, the adapter 200 may further include a first isolation unit and a second isolation unit.

The first isolation unit is configured to isolate the parasitic capacitance generated by the at least one first transistor 231. The second isolation unit is configured to isolate the parasitic capacitance generated by the at least one second transistor 232. One end of the first isolation unit is connected to the first microwave unit 221, and the other end is connected to the at least one first transistor 231. One end of the second isolation unit is connected to the second microwave unit 222, and the other end is connected to the at least one second transistor 232.

In the embodiment of the present disclosure, taking one first transistor 231 and one second transistor 232 as an example, the first isolation unit can isolate the parasitic capacitance generated by the first transistor 231 at the high frequency from transmitting to other circuit modules, for example, the second transistor 232. The second isolation unit can isolate the parasitic capacitance generated by the second transistor 232 at the high frequency to other circuit modules, for example, the transmission of the first transistor 231. Thus, the crosstalk of the circuit can be further prevented.

In the embodiment of the present disclosure, since the transmission speed of microwaves is relatively fast, the distance between the first transmitting terminal and the first receiving terminal of the first microwave unit 221 may be set farther, for example, may be greater than a first threshold. Therefore, the first microwave unit 221 itself can isolate the transmission of the parasitic capacitance generated by the first transistor 231 to other circuit modules, for example, the second transistor 232. The setting of the first isolation unit can further isolate the transmission of the parasitic capacitance generated by the first transistor 231 to other circuit modules, for example, the second transistor 232.

Similarly, the distance between the second transmitting terminal and the second receiving terminal of the second microwave unit 222 may also be set farther, for example, may be greater than a second threshold. Therefore, the second microwave unit 222 itself can isolate the transmission of the parasitic capacitance generated by the second transistor 232 to other circuit modules, for example, the first transistor 231. The setting of the second isolation unit can further isolate the transmission of the parasitic capacitance generated by the second transistor 232 to other circuit modules, for example, the first transistor 231.

Figure 5:
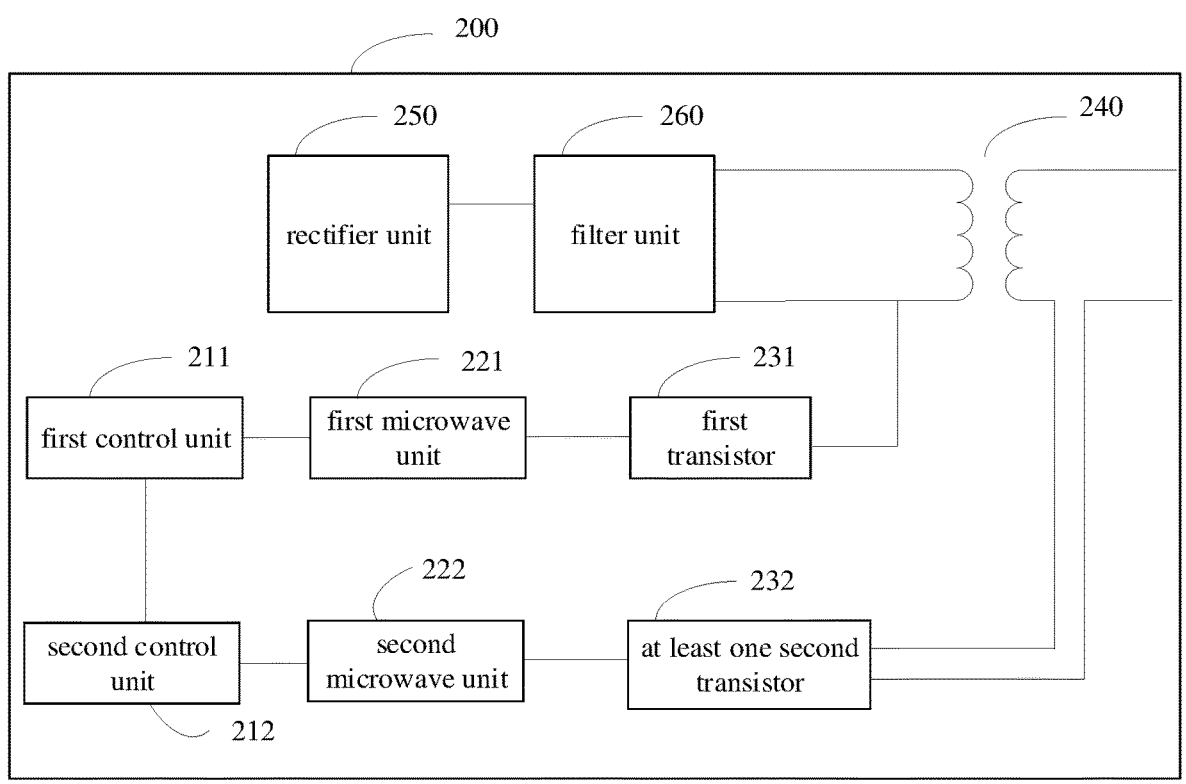
FIG. 5 illustrates a schematic structural diagram of an adapter of an embodiment of the present disclosure.

Alternatively, in some embodiments, as illustrated in FIG. 5, the control unit 210 includes a first control unit 211 and a second control unit 212. The first control unit 211 is connected to the first microwave unit 221, and is configured to output the first control signal to the first microwave unit 221, and to control an output time of the first control signal. The second control unit 212 is connected to the second microwave unit 222 and is configured to output the second control signal to the second microwave unit 222, and to control an output time of the second control signal.

In the embodiment of the present disclosure, the first microwave unit 221 and the second microwave unit 222 can also control the transmission of control signals through two control units respectively. For example, the first control unit 211 can transmit the first control signal to the first microwave unit 221. The first transmitting terminal of the first microwave unit 221 can convert it into a first microwave signal based on the first control signal transmitted by the first control unit 211, and transmit it to the first receiving terminal of the first microwave unit 221. After receiving the first microwave signal, the first receiving terminal can convert the first microwave signal into the first control signal, and transmit the first control signal to the first transistor 231 to control the turn-on or turn-off of the first transistor 231. The second control unit 212 can transmit the second control signal to the second microwave unit 222. The second transmitting terminal of the second microwave unit 222 can convert it into a second microwave signal based on the second control signal transmitted by the second control unit 212, and transmit it to the second receiving terminal of the second microwave unit 221. After receiving the second microwave signal, the second receiving terminal can convert the second microwave signal into the second control signal, and transmit the second control signal to the second transistor 232 to control the turn-on or turn-off of the second transistor 232.

It should be noted that the first control unit 211 and the second control unit 212 can communicate with each other, so that the first control unit 211 and the second control unit 212 can output control signals more accurately.

Alternatively, in some embodiments, time points of a high voltage and/or a low voltage output of the first control signal and time points of a high voltage and/or a low voltage output of the second control signal are different. When the at least one first transistor 231 is completely turned off, the at least one second transistor 232 is turned on.

Alternatively, in some embodiments, the first control unit 211 is further configured to transmit a first synchronization signal to the second control unit 212, and/or receive a second synchronization signal transmitted by the second control unit 212. The second control unit 212 is further configured to send the transmit the second synchronization signal to the first control unit 211, and/or receive the first synchronization signal transmitted by the first control unit 211.

Figure 6:
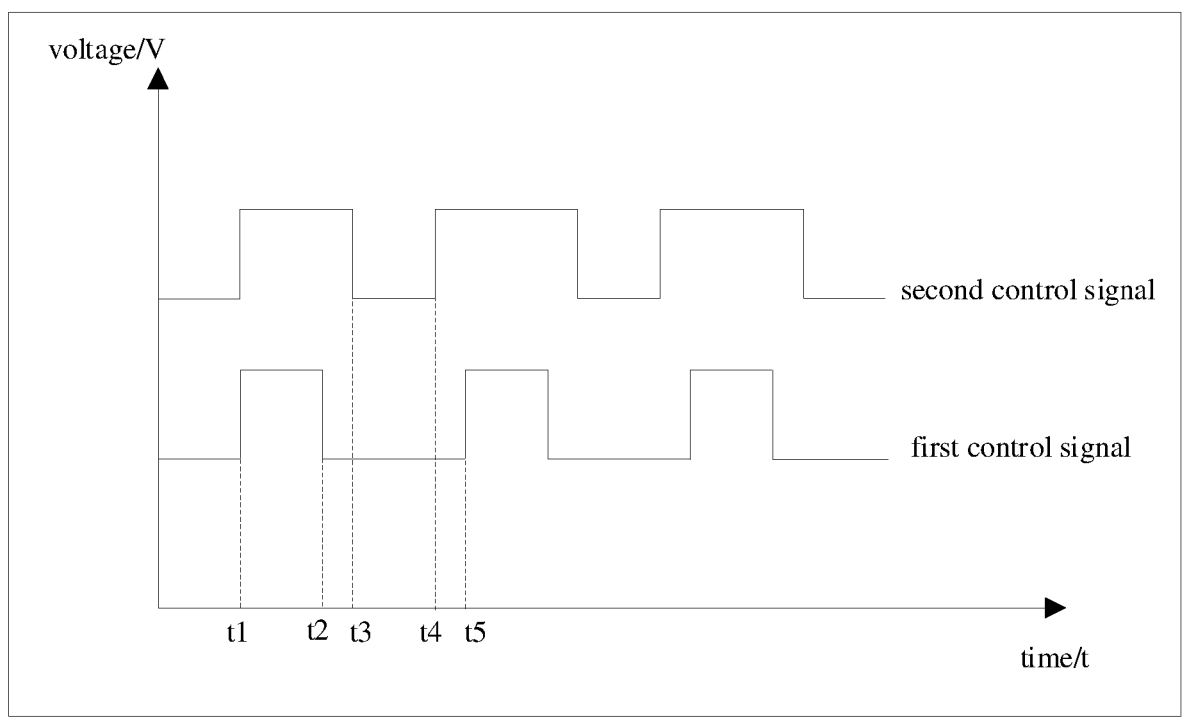
FIG. 6 illustrates a schematic diagram of a control signal output by a control unit of an embodiment of the present disclosure.

Referring to FIG. 6, taking one first transistor 231 and one second transistor 232 as an example, during a time period (t1-t2), the first control unit 211 can output high voltage to control the first transistor 231 to be in the turn-on state, so that the primary side of the transformer 240 stores energy. At a time point of t2, the first control unit 221 can output low voltage to control the first transistor 231 to be in the turn-off state. It can be seen from FIG. 6 that when the first control unit 211 outputs low voltage at the time point t2, the second control unit 212 does not output the low voltage instantaneously, but starts to output the low voltage at the time point t3 to control the second transistor 232 to be turned on, so that the energy stored on the primary side of the transformer 240 can be released to the secondary side of the transformer 240.

A time period (t2-t3) is called a dead time. During this dead time, the first control unit 211 can output low voltage, and the second control unit 212 can output high voltage. The purpose is to control the turn-on of the second transistor 232 after the first transistor 231 is completely turned off. When the energy stored on the primary side of the transformer 240 is released to the secondary side, the parasitic capacitance caused by the early turn-on of the second transistor 232 is prevented from being transmitted to the first transistor 231, which leads to a mis-turn on of the first transistor 231 and causes the crosstalk of the circuit.

In an embodiment of the present disclosure, a communication can be performed between the first control unit 211 and the second control unit 212. For example, the first control unit 211 may notify the first control unit 211 to terminal an output of the high voltage and start an output of the low voltage at the time point t2. After receiving a notification from the first control unit 211, the second control unit 212 can start to output low voltage after a preset dead time. That is, the low voltage can be output at the time point t3. When the energy stored on the primary side of the transformer 240 is released to the secondary side, the parasitic capacitance caused by an early turn-on of the second transistor 232 is prevented from being transmitted to other circuit modules (for example, the first transistor 231), thereby causing circuit crosstalk.

Alternatively, the first control unit 211 terminals the output of the high voltage at the time point t2. At any time point within the dead time period (t2-t3), the second control unit 212 is notified to output low voltage at the time point t3. When the energy stored on the primary side of the transformer 240 is released to the secondary side, the parasitic capacitance caused by the early turn-on of the second transistor 232 is prevented from being transmitted to other circuit modules (for example, the first transistor 231), thereby causing circuit crosstalk.

In the embodiment of the present disclosure, the first control unit 211 may also receive the synchronization signal transmitted by the second control unit 212 to determine the output time for outputting high voltage and/or low voltage.

Alternatively, in some embodiments, the second microwave unit is further configured to feed back a voltage value and/or a current value of the direct current output by the secondary side of the transformer to the control unit. The control unit is further configured to control the output time of the high voltage and/or low voltage of the control signal according to the voltage value and/or the current value which is fed back.

In the embodiment of the present disclosure, the first transistor 231 can be configured to perform a chopping modulation on the voltage input to of the transformer. The second transistor 232 can be configured to synchronously rectify the direct current output by the secondary side of the transformer. Thus, the electronic device connected to the adapter can be charged based on the direct current after synchronous rectification.

In the embodiment of the present disclosure, the direct current output by the secondary side of the transformer 240 can be fed back to the control unit 210 through the second microwave unit 222. The control unit 210 outputs the high voltage and/or low voltage time of the control signal according to the feedback direct current.

For example, if the voltage value of the feedback direct current received by the control unit 210 is small, the control unit 210 may control to increase the output duration of the high voltage in one cycle. The duration of the turn-on state of the first transistor 231 is increased, so that the voltage value of the direct current output by the secondary side of the transformer can be increased. If the voltage value of the feedback direct current received by the control unit 210 is relatively large, the control unit 210 may control to reduce the output duration of the high voltage in one cycle. The duration of the turn-on state of the first transistor 231 is reduced, so that the voltage value of the direct current output by the secondary side of the transformer can be reduced.

It can be understood that the turn-on time of the first transistor 231 may be related to the direct current output by the secondary side of the transformer 240. That is, the longer the turn-on time of the first transistor 231 is, the larger the direct current output by the secondary side of the transformer 240 is. The shorter the turn-on time of the first transistor 231, the smaller the direct current output by the secondary side of the transformer 240.

In some embodiments, the signal output by the first control unit 211 or the second control unit 212 may be insufficient to control the turn-on or turn-off of the first transistor 231 or the second transistor 232. Therefore, the turn-on or turn-off of the transistor can be controlled by means of a driving unit.

Figure 7:
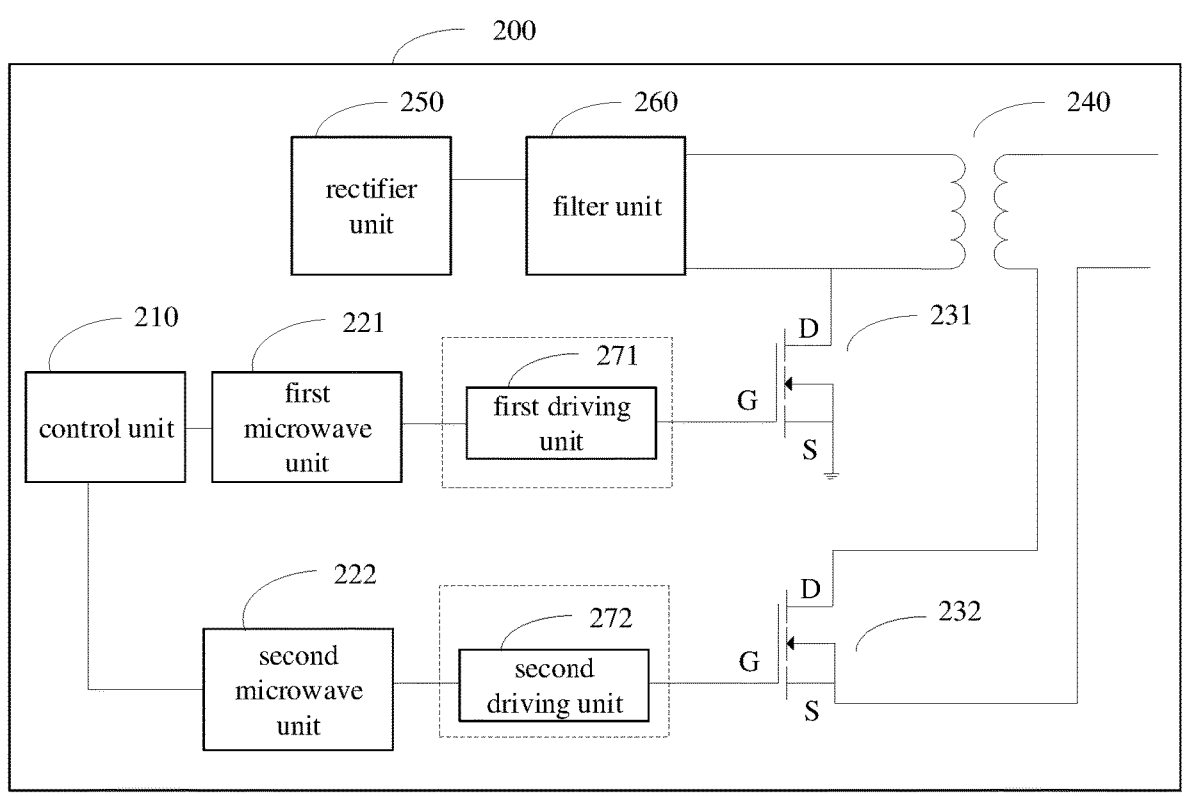
FIG. 7 illustrates a schematic structural diagram of an adapter of an embodiment of the present disclosure.

In an embodiment of the present disclosure, as illustrated in FIG. 7, the driving circuit 200 may further include a first driving unit 271 and a second driving unit 272. The first driving unit 271 can amplify the control signal output by the receiving terminal of the first microwave unit 221, so that the amplified signal can control the turn-on or turn-off of the first transistor 231. The second driving unit 272 can amplify the control signal output by the second microwave unit 222, so that the amplified signal can control the turn-on or turn-off of the second transistor 232.

It can be understood that, in the embodiment of the present disclosure, the first driving unit 271 or the second driving unit 272 can be configured to amplify the control signal output by the control unit 210. That is, the control ability of the control signal can be increased, so that it can control the transistor.

In some embodiments, the first driving unit 271 and/or the second driving unit 272 may also increase a speed at which the control signal rises and falls.

In the embodiments of the present disclosure, the driving unit may be a charge pump bootstrap control circuit, a control chip, or the like.

It should be understood that, in the embodiments of the present disclosure, at least one driving unit may also be included in FIG. 2 to FIG. 5. For example, for FIG. 2, the driving unit can be disposed between the first microwave unit 221 and at least one transistor 231 to amplify the control signal output by the first microwave unit 221 so that it can control at least one transistor 231.

For FIG. 3 to FIG. 5, they can include two driving units. One of the driving units can be disposed between the first microwave unit 221 and the first transistor 231 to amplify the control signal output by the first microwave unit 221 so that it can control the first transistor 231. Another driving unit can be disposed between the second microwave unit 222 and at least one second transistor 232 to amplify the control signal output by the second microwave unit 222 so that it can control at least one second transistor 232.

Alternatively, in some embodiments, the dead time of the first control signal and/or the second control signal is less than the first threshold.

Specifically, the description will be made with reference to FIG. 5 and FIG. 6. As shown in FIG. 5, the first control unit 211 can output a first control signal (e.g., output a high voltage) to control the first transistor 231 to be in the turn-on state. At the time point t2, the first control unit 211 can output low voltage to start to control the first transistor 231 to be in the turn-off state. Referring to FIG. 6, the first control unit 211 outputs a high voltage during the period (tl-t2) to control the first transistor 231 to be in the turn-on state. At the time point t2, low voltage is output to start to control the first transistor 231 to turn off. In addition, when the first control unit 211 outputs the low voltage at the time point t2, the second control unit 212 does not output the low voltage instantaneously, but starts to output the low voltage at the time point t3 to control the second transistor 232 to start turning on.

Similarly, the second control unit 212 can output the second control signal. For example, in the period of (t3-t4), low voltage can be output to make the second transistor 232 to be turned on. At this time, the first transistor is in the turn-off state. At the time point t4, the second control unit 212 can output high voltage to control the second transistor 232 to start turning off. When the second control unit 212 outputs the high voltage, the first control unit 211 does not output the high voltage instantaneously, but starts to output the high voltage at the time point t5 to control the first transistor 231 to start turning on.

The time period (t2-t3) is called the dead time. In an embodiment of the present disclosure, the microwave unit is configured to transmit signals to the transistor. The transmitting terminal of the microwave unit can convert the control signal into the microwave signal and transmit it to the receiving terminal. The microwave has the characteristics of fast transmission, which can make the microwave signal quickly transmit to the receiving terminal of the microwave unit. After the receiving terminal converts the microwave signal into the control signal, the transistor can be turned on or off quickly. Therefore, the duration of the dead time can be set to be less than the first threshold. If the first threshold is 0.4 us, the dead time in the embodiment of the present disclosure may be set to 0.2 us or 0.3 us, etc., which is not specifically limited in the present disclosure.

Alternatively, in some embodiments, a preset frequency of the first control signal and/or the second control signal is greater than a second threshold.

In an embodiment of the present disclosure, the preset frequency of the first control signal and/or the second control signal may be greater than the second threshold. Taking the first control signal as an example, for example, if the second threshold is 200 KHz, if the preset frequency of the first control signal is 250 KHz, that is, a sum of the turn-on and turn-off times of the two transistors can be 4 us. Referring to FIG. 5 and FIG. 6, the first control unit 211 outputs high voltage during the time period (t1-t2). If the dead time is 0.4 us, the time period (t1-t2) in the drawings is 1.6 us, and the time period (t2-t3) in the drawings is 0.4 us. Then, the turn-on time of the first transistor 231 in one cycle is 1.6 us. During the dead time (t2-t3) which is 0.4 us, the first control unit 211 can output low voltage, so that the first transistor 231 is completely turned off. After the first transistor 231 is completely turned off, the second control unit 212 starts to output low voltage, so that the second transistor 232 is turned on.

It can be understood that, when the second control unit 212 outputs the low voltage during the time period (t3-t4), the first control unit 211 can also output the low voltage. so that the first transistor 231 is in the turn-off state, which can prevent circuit crosstalk caused by mis-turn-on of the first transistor 231.

In some embodiments, the preset frequency of the first control signal and the preset frequency of the second control signal may be different, which is not specifically limited in the present disclosure.

It should be understood that the above numerical values are only illustrative, and other numerical values may also be used, which should not be particularly limited to the present disclosure.

It should also be understood that, in the embodiments of the present disclosure, the larger the preset frequency, the smaller the period of the signal output by the control unit. Even if the dead time is set small, the microwave unit in the embodiment of the present disclosure can quickly transmit a signal to the transistor, so that the transistor can be turned on or off quickly. In addition, the parasitic capacitance generated by the transistor is greater at higher frequencies. Since the distance between the transmitting terminal and the receiving terminal of the microwave unit can be set farther, even if the frequency is high, the parasitic capacitance generated by the transistor cannot be transmitted to other circuit modules or devices, thus preventing the crosstalk of the circuit.

As mentioned above, the distance between the transmitting terminal and the receiving terminal of the microwave unit can be set farther, which will be described in detail below.

Alternatively, in some embodiments, a distance between the first transmitting terminal and the first receiving terminal of the first microwave unit is greater than a third threshold. The distance between the second transmitting terminal and the second receiving terminal of the second microwave unit is greater than a fourth threshold.

In an embodiment of the present disclosure, the distance between the first transmitting terminal and the first receiving terminal of the first microwave unit may be greater than the third threshold. For example, if the third threshold is 1 cm, the distance between the transmitting terminal and the receiving terminal of the microwave unit may be 1.5 cm, or 2 cm, etc., which is not specifically limited by the present disclosure.

In the embodiment of the present disclosure, the distance between the second transmitting terminal and the second receiving terminal of the second microwave unit may be greater than the fourth threshold. For example, if the fourth threshold is 0.8 cm, the distance between the second transmitting terminal and the second receiving terminal of the second microwave unit may be 1 cm, or 1.5 cm, etc., which is not specifically limited in the present disclosure.

In the embodiment of the present disclosure, the distance between the first transmitting terminal and the first receiving terminal of the first microwave unit 221 and the distance between the second transmitting terminal and the second receiving terminal of the second microwave unit 222 may be the same or different. The present disclosure does not specifically limit this.

It can be understood that since the transmission of microwaves does not depend on the medium for transmission, the transmission speed is relatively fast, and the time for signal transmission can be reduced. For the microwave unit, its transmitting terminal can convert the control signal into a microwave signal and quickly transmit the microwave signal to the receiving terminal. After receiving the microwave signal, the receiving terminal can convert the microwave signal into the control signal, which can make the transistor respond quickly, that is, it can make the transistor to be turned on or off quickly.

The apparatus embodiments of the present disclosure are described in detail above with reference to FIG. 1 to FIG. 7. Method embodiments of the present disclosure is described below with reference to FIG. 8. The method embodiments and the apparatus embodiments correspond to each other, so for elements that are not described in detail, reference may be made to the foregoing apparatus embodiments.

Figure 8:
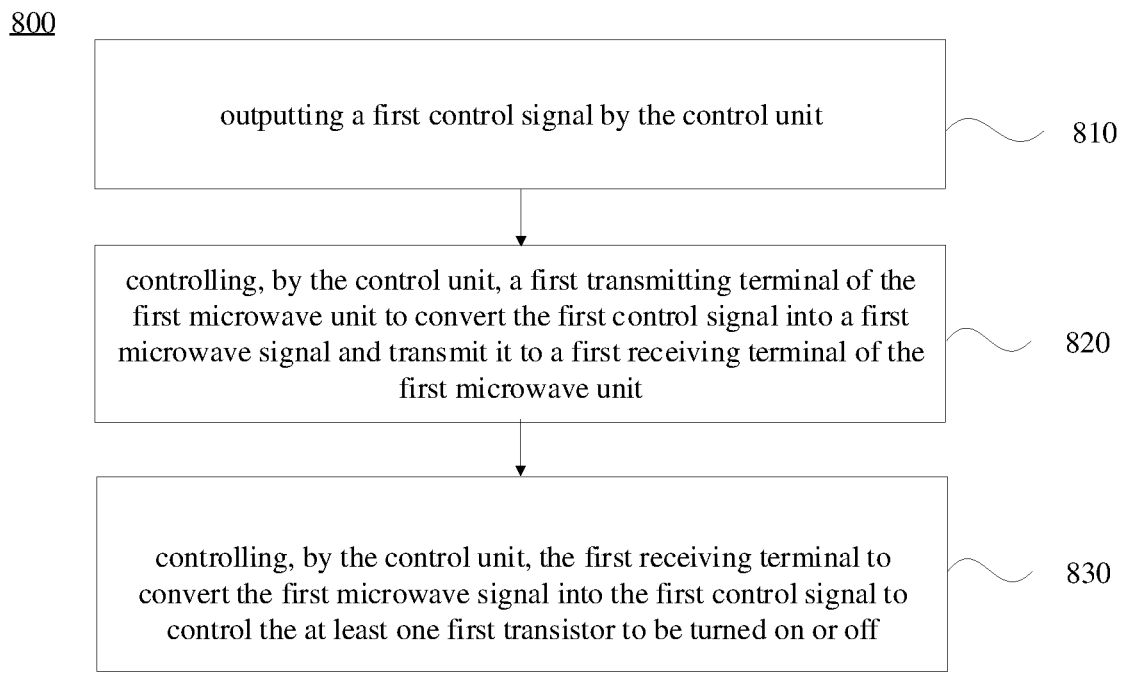
FIG. 8 illustrates a schematic flowchart of a control method of an embodiment of the present disclosure.

As illustrated in FIG. 8, which is a control method 800 of an embodiment of the present disclosure. The method is applied to an adapter. The adapter includes a transformer, at least one first transistor, a control unit, and a first microwave unit. The method 800 may include steps 810-830.

In 810, the control unit outputs a first control signal.

In 820, the control unit controls a first transmitting terminal of the first microwave unit to convert the first control signal into a first microwave signal and transmit it to a first receiving terminal of the first microwave unit.

In 830, the control unit controls the first receiving terminal to convert the first microwave signal into the first control signal to control the at least one first transistor to be turned on or off.

Alternatively, in some embodiments, in the controlling, by the control unit, the first receiving terminal to convert the first microwave signal into the first control signal to control the at least one first transistor to be turned on or off, the method includes that the control unit controls the first receiving terminal to convert the first microwave signal into the first control signal to control the at least one first transistor to be turned on or off, and to isolate a parasitic capacitance generated by the at least one first transistor.

Alternatively, in some embodiments, the adapter further includes at least one second transistor and a second microwave unit. The method 800 further includes following steps. The control unit outputs a second control signal. The control unit controls a second transmitting terminal of the second microwave unit to convert the second control signal into a second microwave signal and transmit it to a second receiving terminal. The control unit controls the second receiving terminal to convert the second microwave signal into the second control signal to control the at least one second transistor to be turned on or off.

Alternatively, in some embodiments, in the controlling, by the control unit, the second receiving terminal to convert the second microwave signal into the second control signal to control the at least one second transistor to be turned on or off, the method includes that the control unit controls the second receiving terminal to convert the second microwave signal into the second control signal to control the at least one second transistor to be turned on or off, and to isolate a parasitic capacitance generated by the at least one second transistor.

Alternatively, in some embodiments, the control unit includes a first control unit and a second control unit. In the outputting the control signal by the control unit, the method includes that the first control unit output the first control signal to the first microwave unit, and controls an output time of the first control signal, and the second control unit outputs the second control signal to the second microwave unit, and controls an output time of the second control signal.

Alternatively, in some embodiments, time points of a high voltage and/or a low voltage output of the first control signal and time points of a high voltage and/or a low voltage output of the second control signal are different, so that in response to the at least one first transistor being completely turned off, the at least one second transistor is turned on.

Alternatively, in some embodiments, the method 800 further includes following steps. The first control unit transmits a first synchronization signal to the second control unit, and/or receives a second synchronization signal transmitted by the second control unit. The second control unit transmits the second synchronization signal to the first control unit, and/or receives the first synchronization signal transmitted by the first control unit.

Alternatively, in some embodiments, the method 800 further includes steps. The second microwave unit feeds back a voltage value and/or a current value of a direct current output by a secondary side of the transformer to the control unit. The control unit controls an output time of a high voltage and/or a low voltage of the control signal according to the voltage value and/or the current value which is fed back.

Alternatively, in some embodiments, a dead time of the first control signal and/or the second control signal is less than a first threshold.

Alternatively, in some embodiments, a preset frequency of the first control signal and/or the second control signal is greater than the second threshold.

Alternatively, in some embodiments, the first microwave unit and/or the second microwave unit includes an IC chip. An extremely high frequency antenna is packaged in the IC chip.

Embodiments of the present disclosure also provide a computer-readable storage medium storing computer-executable instructions. The computer-executable instructions are configured to perform any of the charging methods 800 described above.

Embodiments of the present disclosure also provide a computer program product. The computer program product includes a computer program stored on a computer-readable storage medium. The computer program includes program instructions. When the program instructions are executed by computer, the computer executes any one of the above charging methods 800.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, a solid-state drive (solid state disk, SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or other forms.

In the present disclosure, even though the terms "first", "second", etc. may be configured to describe various devices, the devices should not be limited by these terms. These terms are only configured to distinguish one device from another. For example, when the meaning of the description is not changed, a first device may be referred to as a second device, and similarly, a second device may be referred to as a first device, as long as each "first device" occurred is renamed and each "second device" occurred is renamed. The first device and the second device are both devices, but may not be the same device.

The units described as separate parts may or may not be physically separated, and parts displayed as units may or may not be physical units, that is, may be located in one place, or may be distributed on a plurality of network units. Some or all of the units may be selected according to actual requirements to achieve the solutions in the embodiments.

In addition, functional units in the embodiments of the disclosure may be integrated in one processing unit, or each of the units may be physically existed alone, or two or more units may be integrated in one unit.

The above are only specific implementations of the disclosure, however, the protection scope of the present disclosure is not limited here, and those skilled in the art may easily think of any changes or substitutions within the technical scope of the present disclosure, which shall be within the protection scope of the disclosure. Therefore, the protection scope of the disclosure shall be subject to the protection scope of the claims.

What is claimed is:

1. An adapter, comprising:
    a transformer;
    at least one first transistor connected to a primary side of the transformer, and configured to perform a chopping modulation on a voltage input to the transformer;
    a control unit configured to output a first control signal; and
    a first microwave unit comprising a first transmitting terminal and a first receiving terminal, wherein the first transmitting terminal is connected to the control unit, the first receiving terminal is connected to the at least one first transistor, the first transmitting terminal is configured to convert the first control signal into a first microwave signal and transmit it to the first receiving terminal, and the first receiving terminal is configured to convert the first microwave signal into the first control signal to control the at least one first transistor to be turned on or off.

2. The adapter according to claim 1, wherein the first microwave unit is further configured to transmit the first control signal to control the at least one first transistor to be turned on or off, and to isolate a parasitic capacitance generated by the at least one first transistor.

3. The adapter according to claim 1, wherein the adapter also comprises:
    at least one second transistor configured to synchronously rectify a direct current output by the transformer, wherein the control unit is also configured to output a second control signal; and
    a second microwave unit comprising a second transmitting terminal and a second receiving terminal, wherein the second transmitting terminal is connected to the control unit, the second receiving terminal is connected to the at least one second transistor, the second transmitting terminal is configured to convert the second control signal into a second microwave signal and transmit it to the second receiving terminal, and the second receiving terminal is configured to convert the second microwave signal into the second control signal to control the at least one second transistor to be turned on or off.

4. The adapter according to claim 3, wherein the second microwave unit is further configured to transmit the second control signal to control the at least one second transistor to be turned on or off, and to isolate a parasitic capacitance generated by the at least one second transistor.

5. The adapter according to claim 3, wherein the control unit comprises:
    a first control unit connected to the first microwave unit, configured to output the first control signal to the first microwave unit, and configured to control an output time of the first control signal; and a second control unit connected to the second microwave unit, configured to output the second control signal to the second microwave unit, and configured to control an output time of the second control signal.

6. The adapter according to claim 3, wherein time points of a high voltage and/or a low voltage output of the first control signal and time points of a high voltage and/or a low voltage output of the second control signal are different, so that in response to the at least one first transistor being completely turned off, the at least one second transistor is turned on.

7. The adapter according to claim 5, wherein the first control unit is further configured to transmit a first synchronization signal to the second control unit, and/or receive a second synchronization signal transmitted by the second control unit;

the second control unit is further configured to transmit the second synchronization signal to the first control unit, and/or receive the first synchronization signal transmitted by the first control unit.

8. The adapter according to claim 3, wherein the second microwave unit is further configured to provide feedback a voltage value and/or a current value of a direct current output by a secondary side of the transformer to the control unit;

the control unit is further configured to control an output time of a high voltage and/or a low voltage of the control signal according to the voltage value and/or the current value which is fed back.

9. The adapter according to claim 3, wherein a dead time of the first control signal and/or the second control signal is less than a first threshold.

10. The adapter according to claim 3, wherein a preset frequency of the first control signal and/or the second control signal is greater than a second threshold.

11. The adapter according to claim 3, wherein the first microwave unit and/or the second microwave unit comprises an integrated circuit (IC) chip, and an extremely high frequency antenna is packaged in the IC chip.

12. A control method, the method applied to an adapter, the adapter comprising a transformer, at least one first transistor, a control unit, and a first microwave unit, the method comprising:

outputting a first control signal by the control unit;

controlling, by the control unit, a first transmitting terminal of the first microwave unit to convert the first control signal into a first microwave signal and transmit it to a first receiving terminal of the first microwave unit; and controlling, by the control unit, the first receiving terminal to convert the first microwave signal into the first control signal to control the at least one first transistor to be turned on or off.

13. The method according to claim 12, wherein the controlling, by the control unit, the first receiving terminal to convert the first microwave signal into the first control signal to control the at least one first transistor to be turned on or off comprises:

controlling, by the control unit, the first receiving terminal to convert the first microwave signal into the first control signal to control the at least one first transistor to be turned on or off, and to isolate a parasitic capacitance generated by the at least one first transistor.

14. The method according to claim 12, wherein the adapter further comprises at least one second transistor and a second microwave unit, and the method further comprises:

outputting a second control signal by the control unit;

controlling, by the control unit, a second transmitting terminal of the second microwave unit to convert the second control signal into a second microwave signal and transmit it to a second receiving terminal; and controlling, by the control unit, the second receiving terminal to convert the second microwave signal into the second control signal to control the at least one second transistor to be turned on or off, wherein the at least one second transistor is configured to synchronously rectify a direct current output by the transformer.

15. The method according to claim 14, wherein the controlling, by the control unit, the second receiving terminal to convert the second microwave signal into the second control signal to control the at least one second transistor to be turned on or off comprises:

controlling, by the control unit, the second receiving terminal to convert the second microwave signal into the second control signal to control the at least one second transistor to be turned on or off, and to isolate a parasitic capacitance generated by the at least one second transistor.

16. The method according to claim 14, wherein the control unit comprises a first control unit and a second control unit;

the outputting the control signal by the control unit comprises:

outputting, by the first control unit, the first control signal to the first microwave unit, and controlling an output time of the first control signal; and outputting, by the second control unit, the second control signal to the second microwave unit, and controlling an output time of the second control signal.

17. The method according to claim 14, wherein time points of a high voltage and/or a low voltage output of the first control signal and time points of a high voltage and/or a low voltage output of the second control signal are different, so that in response to the at least one first transistor being completely turned off, the at least one second transistor is turned on.

18. The method according to claim 16, wherein the method further comprises:

transmitting, by the first control unit, a first synchronization signal to the second control unit, and/or receiving, by the first control unit, a second synchronization signal transmitted by the second control unit;

transmitting, by the second control unit, the second synchronization signal to the first control unit, and/or receiving, by the second control unit, the first synchronization signal transmitted by the first control unit.

19. The method according to claim 14, wherein the method further comprises:

feeding back, by the second microwave unit, a voltage value and/or a current value of a direct current output by a secondary side of the transformer to the control unit;

controlling, by the control unit, an output time of a high voltage and/or a low voltage of the control signal according to the voltage value and/or the current value which is fed back.

20. The method according to claim 14, wherein a dead time of the first control signal and/or the second control signal is less than a first threshold.

* * * * *